United States Patent
Guo et al.

(10) Patent No.: US 12,198,056 B2
(45) Date of Patent: Jan. 14, 2025

(54) LAYER FUSION IN NEURAL NETWORK PROCESSING

(71) Applicant: Cambricon Technologies Corporation Limited, Beijing (CN)

(72) Inventors: Zhibin Guo, Beijing (CN); Shijin Zhang, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 899 days.

(21) Appl. No.: 16/714,669

(22) Filed: Dec. 13, 2019

(65) Prior Publication Data

US 2020/0210821 A1 Jul. 2, 2020

(30) Foreign Application Priority Data

Dec. 29, 2018 (CN) .......................... 201811646320.9

(51) Int. Cl.
*G06N 3/082* (2023.01)
*G06N 3/04* (2023.01)

(52) U.S. Cl.
CPC ............... *G06N 3/082* (2013.01); *G06N 3/04* (2013.01)

(58) Field of Classification Search
CPC ........ G06N 3/082; G06N 3/04; G06N 3/0454; G06N 3/105; G06N 3/063; G06N 3/08; G06N 5/04; G06F 2207/4824; G06F 7/08; G06F 8/41
See application file for complete search history.

(56) References Cited

U.S. PATENT DOCUMENTS

| | | | | |
|---|---|---|---|---|
| 2018/0285727 | A1* | 10/2018 | Baum | .................. G06N 3/0454 |
| 2018/0293057 | A1* | 10/2018 | Sun | .......................... G06N 3/08 |
| 2019/0042513 | A1* | 2/2019 | Fleming, Jr. | ........ G06F 9/30145 |

FOREIGN PATENT DOCUMENTS

| | | |
|---|---|---|
| CN | 106845631 A | 6/2017 |
| CN | 108876702 A | 11/2018 |

OTHER PUBLICATIONS

Ji, Yu, et al. "Bridge the gap between neural networks and neuromorphic hardware with a neural network compiler." Proceedings of the twenty-third international conference on architectural support for programming languages and operating systems. 2018. (Year: 2018).*

(Continued)

*Primary Examiner* — Michael W Ayers
*Assistant Examiner* — Sidney Vincent Bostwick
(74) *Attorney, Agent, or Firm* — Getech Law LLC; Jun Ye (57) ABSTRACT

The present disclosure relates to a data processing method, a device, an electronic device, and a readable storage medium. When the above are adopted, a target neural network is subject to a subnet classification. The target neural network includes at least one subnet. When the method is adopted, at least during the process of compiling and running the subnets, only one input operation and one output operation are required. Whereas when the network layers of the subnet are compiled and run layer by layer, pluralities of input operations and output operations are required. Therefore, the data processing method is more efficient and is capable of improving the operation rate.

12 Claims, 6 Drawing Sheets

(56) References Cited

OTHER PUBLICATIONS

Moreau, Thierry, Adrian Sampson, and Luis Ceze. "Approximate computing: Making mobile systems more efficient." IEEE Pervasive Computing 14.2 (2015): 9-13. (Year: 2015).*
Chen, Tianqi, et al. "{TVM}: An automated {End-to-End} optimizing compiler for deep learning." 13th USENIX Symposium on Operating Systems Design and Implementation (OSDI 18). 2018. (Year: 2018).*
Rotem, Nadav, et al. "Glow: Graph lowering compiler techniques for neural networks." arXiv preprint arXiv:1805.00907 (2018). (Year: 2018).*
201811646320.9—Office Action, mailed Aug. 2, 2019, 8 pages. (no English translation).
CN202010214661.X—First Office Action mailed on Mar. 14, 2023, 10 Pages. (With Brief English Explanation).

\* cited by examiner

FIG. 1a obtaining model data and weight data of a target neural network, where the target neural network includes at least one subnet, each subnet includes at least one network layer, the network layer of the subnet has a same fusion attribute, and at least one operator of the network layer is fused into a fusion operator — 101 determining an order of execution for each subnet in the target neural network — 102 compiling and running the fusion operator corresponding to each subnet in overall according to the model data, the weight data, and the order of execution of each subnet of the target neural network to obtain an output result of the target neural network — 103

LAYER FUSION IN NEURAL NETWORK PROCESSING

TECHNICAL FIELD

The present disclosure relates to a field of neural network technology, and in particular to a data processing method, a device, an electronic device, and a readable storage medium.

BACKGROUND

Deep learning usually includes two stages: training and inference. Training is for searching and obtaining an optimal parameter of a neural network model. Inference is for performing inference, namely forward operations, on new input data based on a trained neural network model to obtain a target output.

At present, the forward operation of neural network models based on deep learning frameworks such as Caffe is implemented in a way that a processor compiles and runs a neural network layer by layer. In other words, an operation of each layer is regarded as a separate operation. When the operation of each layer is performed, at least one input copy and at least one output copy are required.

In summary, the current method for performing layer-wise forward operation of neural networks has a problem of low operation rate.

SUMMARY

In view of the above-mentioned technical problem, it is necessary to provide a data processing method, a device, an electronic device, and a readable storage medium that are capable of improving the operation rate.

A first aspect provides a data processing method including:
 obtaining model data and weight data of a target neural network, where the target neural network includes at least one subnet, each subnet includes at least one network layer, the network layer of each subnet has a same fusion attribute, and at least one operator of the network layer is fused into a fusion operator;
 determining an order of execution of each subnet in the target neural network; and
 compiling and running the fusion operator corresponding to each subnet in overall according to the model data, the weight data, and the order of execution of each subnet of the target neural network to obtain an output result of the target neural network.

In an example of the present disclosure, the method further includes:
 obtaining an original neural network corresponding to the target neural network;
 determining the fusion attribute of each network layer according to configuration information of each network layer in the original neural network; and
 fusing at least one network layer with the same fusion attribute into a subnet according to the fusion attribute of each network layer in the original neural network and a dependency between each network layer.

In an example, the fusion attribute of the network layer includes a first fusion attribute and a second fusion attribute. The determining the fusion attribute of each network layer according to the configuration information of each network layer in the original neural network includes:
 obtaining a return value of a preset fusion attribute function of each network layer;
 if the return value of the network layer is a first return value, determining that the fusion attribute of the network layer is the first fusion attribute; and
 if the return value of the network layer is a second return value, determining that the fusion attribute of the network layer is the second fusion attribute.

In an example, the fusing at least one network layer with the same fusion attribute into a subnet according to the fusion attribute of each network layer in the original neural network and the dependency between each network layer includes:
 determining a topological sort of each network layer according to the dependency between each network layer;
 according to the topological sort, if the fusion attribute of a current network layer is the first fusion attribute, classifying the current network layer and a previous network layer of the current network layer as the same subnet when the current network layer has the same fusion attribute as the previous network layer of the current network layer does; and
 according to the topological sort, if the fusion attribute of the current network layer is the second fusion attribute, classifying the current network layer as a separate subnet.

In an example, the fusing at least one network layer with the same fusion attribute into a subnet according to the fusion attribute of each network layer in the original neural network and the dependency between each network layer includes:
 determining a topological sort of each network layer according to the dependency between each network layer;
 according to the topological sort, if the current network layer has the same fusion attribute as a previous network layer of the current network layer does, the current network layer and the previous network layer of the current network layer belong to the same subnet; and
 according to the topological sort, if the current network layer has a different fusion attribute than the previous network layer of the current network layer does, the current network layer and the previous network layer of the current network layer belong to different subnets.

In an example of the present disclosure, the method further includes:
 adding an operator corresponding to each network layer of the subnet to a same fusion operator according to a preset fusion function in each network layer.

In an example, the compiling and running the fusion operator in overall corresponding to each subnet to obtain the output result of the target neural network includes:
 compiling each fusion operator to obtain a computational instruction corresponding to each fusion operator; and
 running each subnet according to the computational instruction of each fusion operator and weight data and input data of each subnet to obtain the output result of the target neural network.

In an example, the determining the order of execution of each subnet in the target neural network includes:
 if at least one network layer of a current subnet has a dependency on at least one network layer of another subnet, determining that the current subnet has a dependency on the another subnet, so as to determine dependencies between the respective subnets; and
 determining the order of execution of each subnet according to the dependencies between the respective subnets.

In an example, the order of execution of each subnet and network layer information of each subnet are stored in a target object created in Caffe.

In an example, the compiling and running each subnet in overall according to the model data, the weight data, and the order of execution of each subnet of the target neural network to obtain the output result of the target neural network includes:

determining the fusion attribute of each subnet, where the fusion attribute of each subnet is the same as the fusion attribute of each network layer of the subnet;

determining a target processor corresponding to each subnet according to the fusion attribute of each subnet; and based on the order of execution of each subnet, compiling and running, by the target processor corresponding to each subnet, the fusion operator of each subnet in overall to obtain the output result of the target neural network according to model data and weight data of each subnet.

In an example of the present disclosure, the fusion attribute of the subnet includes the first fusion attribute and the second fusion attribute, and the method further includes:

if the fusion attribute of the subnet is the first fusion attribute, determining that a target processor corresponding to the subnet is an artificial intelligence processor; and if the fusion attribute of the subnet is the second fusion attribute, determining that the target processor corresponding to the subnet is a general-purpose processor.

A second aspect provides a data processing device including:

a network data obtaining model configured to obtain model data and weight data of a target neural network, where the target neural network includes at least one subnet, each subnet includes at least one network layer, the network layer of the subnet has a same fusion attribute, and at least one operator of the network layer is fused into a fusion operator;

an execution order determination module configured to determine an order of execution of each subnet in the target neural network; and a neural network operation module configured to compile and run the fusion operator corresponding to each subnet in overall according to the model data, the weight data, and the order of execution of each subnet of the target neural network to obtain an output result of the target neural network.

A third aspect provides an electronic device including a memory and a processor. A computer program is stored in the memory. When the processor executes the computer program, the processor implements the following steps:

obtaining model data and weight data of a target neural network, where the target neural network includes at least one subnet, each subnet includes at least one network layer, the network layer of the subnet has a same fusion attribute, and at least one operator of the network layer is fused into a fusion operator;

determining an order of execution of each subnet in the target neural network; and compiling and running the fusion operator corresponding to each subnet according to the model data, the weight data, and the order of execution of each subnet of the target neural network to obtain an output result of the target neural network.

In an example, the processor includes a first processor and a second processor, where the first processor is an artificial intelligence processor and the second processor is a general-purpose processor.

A fourth aspect provides a readable storage medium. A computer program is stored in the readable storage medium. When a processor executes the computer program, the processor implements the following steps:

obtaining model data and weight data of a target neural network, where the target neural network includes at least one subnet, each subnet includes at least one network layer, the network layer of the subnet has a same fusion attribute, and at least one operator of the network layer is fused into a fusion operator;

determining an order of execution of each subnet in the target neural network; and compiling and running the fusion operator corresponding to each subnet in overall according to the model data, the weight data, and the order of execution of each subnet of the target neural network to obtain an output result of the target neural network.

When the data processing method, the device, the electronic device, and the readable storage medium are adopted, a target neural network is subject to subnet classification. The target neural network includes at least one subnet, where each subnet includes at least one network layer, the network layer of the subnet has a same fusion attribute, and at least one operator of the network layer is fused into a fusion operator. When performing the computation on the subnet, the electronic device is capable of compiling all operators of all network layers of the subnet in overall to obtain a computational instruction of the subnet. Then the electronic device may obtain output data of the subnet according to input data, weight data, and the computational instruction of the subnet. In other words, at least for the subnet, compared with pluralities of input operations and output operations required to perform operations on network layers in the subnet layer by layer, only one input operation and one output operation are required, thus the operation rate may be improved.

DETAILED DESCRIPTION

In order to make the purposes, technical schemes, and technical effects of the present disclosure clearer, the present disclosure will be described hereinafter with reference to the accompanied drawings and examples. It should be understood that the examples described here are merely used for explaining the present disclosure, rather than limiting the present disclosure.

Figure 1A:
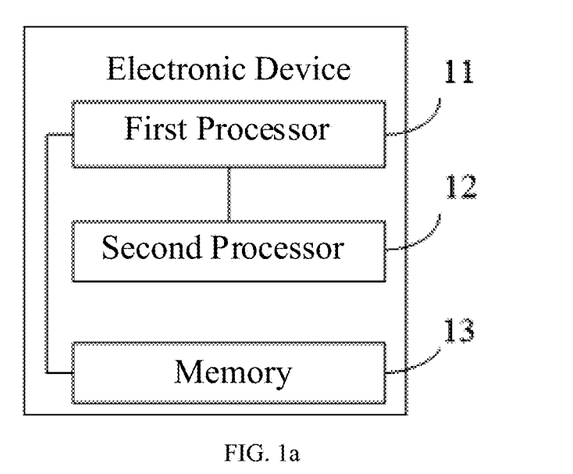
FIG. 1a is a diagram showing an application environment of a data processing method according to an example.

A data processing method provided in the present disclosure may be applied to an electronic device with neural network processing capabilities, such as a motherboard and a computer. The electronic device may be isomorphic or heterogeneous. As shown in FIG. 1a, the electronic device may include a first processor 11, a second processor 12, and a memory 13. The first processor 11 and the second processor 12 may be, but not limited to, one of the following combinations of: CPU (Central Processing Unit) and an artificial intelligence processor, CPU and DSP (Digital Signal Processing), CPU and GPU (Graphics Processing Unit), and GPU and an artificial intelligence processor. A computer program is stored in the memory 13. The first processor 11 is configured to realize neural network operations when executing the computer program, and process image data, text data, and voice data that are input to the first processor 11, so that various functions such as pattern recognition, automatic control, and prediction and estimation may be realized. The second processor 12 is configured to, when the first processor performs a neural network operation, receive a computational instruction and input data that are related to the second processor and are sent by the first processor, return a computation result, so as to realize computations of some network layers of the neural network. It may be understood that the first processor 11 or the second processor 12 is also capable of realizing the above-mentioned neural network operation independently.

The target neural network in the example may be built based on a neural network framework such as Caffe, and may also be built by using another programming language. Neural networks of various types may be built by network layers of various types that are directed connected to each other, which include but are not limited to network layers such as a convolutional layer, a pooling layer, a fully connected layer, and an activation layer. Each network layer corresponds to at least one operator. For instance, an activation layer may correspond to a relu operator, and a convolutional layer may correspond to a convolutional operator. Generally, a processor performs a neural network operation performed layer by layer. A processor may compile an operator in a current network layer to obtain a computational instruction, then process input data according to the computational instruction to obtain output data of the current network layer. The input data is output data of a previous layer and is input to the current layer by the previous layer. In other words, when a computation of a layer is performed, at least one input operation and at least one output operation are required, which has a problem of low operation rate.

When the data processing method of the current example is applied to an isomorphic electronic device, a processor of the isomorphic electronic device may try to classify a plurality of network layers supported by the processor into one subnet. When performing a computation on the subnet, the processor may compile all operators of all network layers of the subnet in overall to obtain a computational instruction of the subnet, then obtain output data of the subnet according to input data of the subnet and the computational instruction of the subnet. In other words, at least for the subnet, compared with pluralities of input operations and output operations required to perform operations on network layers in the subnet layer by layer, only one input operation and one output operation are required, thus the operation rate may be improved. Similarly, when the data processing method of the current example is applied to a heterogeneous electronic device, a first processor or a second processor may perform the above-mentioned fusion compiling on a plurality of network layers supported by the processor. Alternatively, the second processor may perform the fusion compiling separately on a plurality of network layers supported by the second processor and then run the network layers, and the first processor may compile other subnets that are not supported by the second processor layer by layer and then run the network layers. Overall, the examples above all fall within the protection scope of the present method.

For the sake of conciseness, an instance in which the data processing method is applied to a heterogeneous electronic device, the first processor is a central processing unit, and the second processor is an artificial intelligence processor is used for description.

Figure 1B:
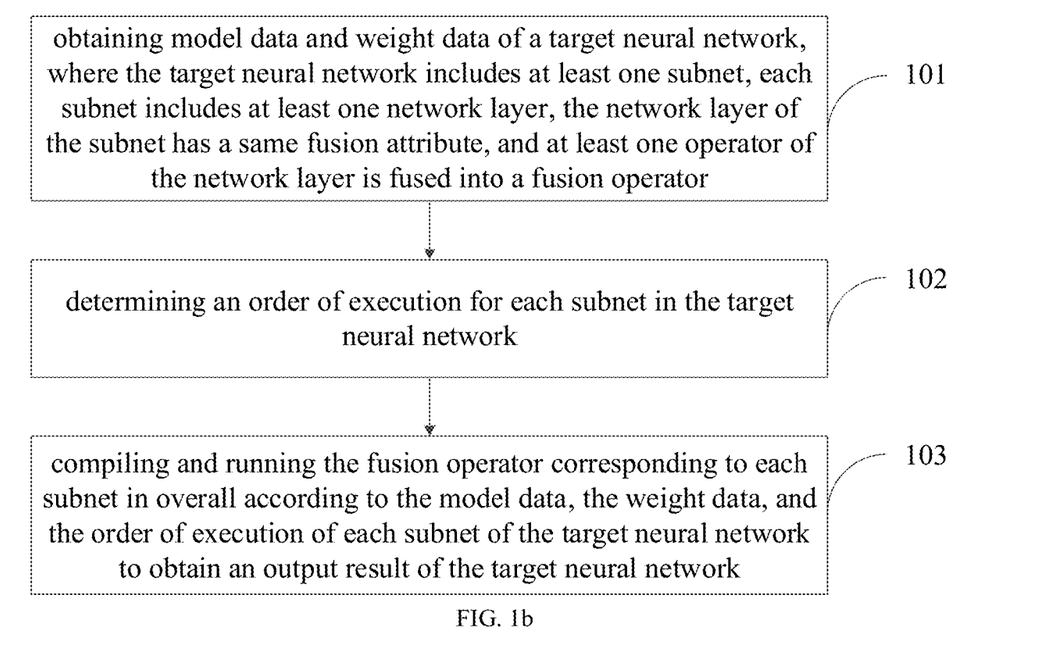
FIG. 1b is a flowchart of a data processing method according to an example.

In an example, as show in FIG. 1b, the present disclosure provides a data processing method. The method being used in the electronic device of FIG. 1a is used for explanation. The method includes:

S101, obtaining model data and weight data of a target neural network, where the target neural network includes at least one subnet, each subnet includes at least one network layer, the network layer of the subnet has a same fusion attribute, and at least one operator of the network layer is fused into a fusion operator.

Weight data of the target neural network may be trained weight data or initial weight data. Model data of the target neural network may include but not limited to input data of the target neural network, a fusion operator of each subnet, dependencies between subnets (directed connections or output/input relations), and the like.

The network layer of each subnet has the same fusion attribute, and at least one network layer of each subnet may be fused into a network layer. In other words, the subnet may correspond to a fusion operator. The fusion operator may include the operator of each network layer of the subnet. It may be understood that there are dependencies between operators of the network layers, and the dependencies are in accordance with the dependencies between the network layers. Alternatively, the fusion attribute of each network layer may indicate whether the network layer can run in the first processor. For instance, when the first processor supports a fusion operation of the network layer, the fusion attribute of the network layer may be the first fusion attribute. When the first processor does not support the fusion operation of the network layer, the fusion attribute of the network layer may be the second fusion attribute.

The method includes: S102, determining an order of execution of each subnet in the target neural network.

Specifically, the electronic device may obtain dependencies between the subnets of the target neural network, and determine an order of execution for the subnets according to the dependencies between the subnets. The dependencies between the subnets of the target neural network may be prestored in a target object created in Caffe. The dependencies between the subnets refer to input relations and output relations between the subnets.

The method includes: S103, compiling and running the fusion operator corresponding to each subnet in overall according to the model data, the weight data, and the order of execution of each subnet of the target neural network to obtain an output result of the target neural network.

Specifically, the electronic device may obtain and preprocess input data in the model data, or may input the input data to the target neural network directly, and a first network layer or subnet may preprocess the input data. Then the electronic device performs the neural network operation in S103 according to the order of execution of the subnets. Alternatively, the input data may be image data, text data, voice data, and the like. The preprocessing may include: subtracting by a mean value, normalization, and the like.

The fusion operators of the subnets include operators of all network layers of the subnets. Computational instructions for the fusion operators, which are computational instructions of the subnets, may be obtained by compiling the fusion operators without the need for compiling the operators of all the network layers in the subnets one by one. In this way, for computations of the subnets, output data of the subnets may be obtained according to the input data, the weight data, and the computational instructions of the subnets, which means only one input operation and one output operation are needed. If the operators of the network layers in the subnets are compiled respectively to obtain the computational instructions of the network layers, for the computations of the network layers, the output data of the network layers may be obtained according to input data, weight data, and the computational instructions of the network layers, which means one input operation and one output operation are required for the computation of each of the network layers in the subnets. Comparatively, compiling the fusion operators of the subnets may simplify the input and output operations during computations, thus improving the operation rate.

In an example, in the step S103, the compiling and running the fusion operator in overall corresponding to each subnet to obtain the output result of the target neural network includes:

compiling each fusion operator to obtain a computational instruction corresponding to each fusion operator; and running each subnet according to the computational instruction of each fusion operator and weight data and input data of each subnet to obtain the output result of the target neural network.

Specifically, the electronic device may first compile the fusion operator of each subnet in overall to obtain the computational instruction corresponding to each fusion operator, then perform the fusion operator corresponding to each subnet according to the order of execution of each subnet, the computational instruction of the fusion operator, and the input data of each fusion operator to obtain the output result of the target neural network. Of course, during the running of the network, the electronic device may compile the fusion operator of each subnet and run each subnet to obtain the output result of the target neural network according to the order of execution of each subnet.

Figure 2:
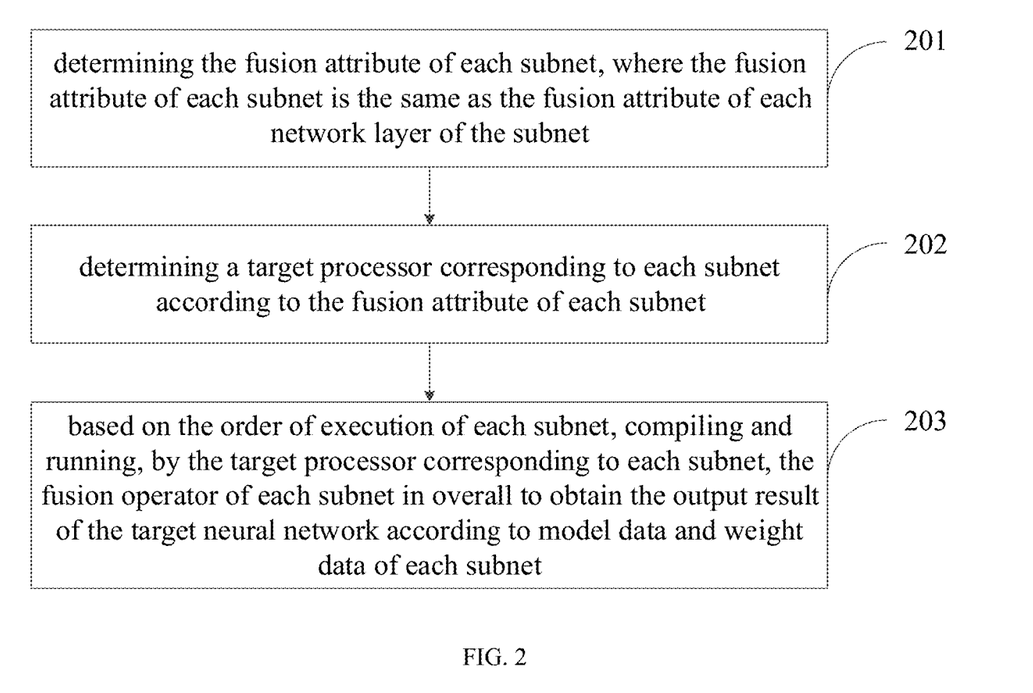
FIG. 2 is a flowchart of a data processing method according to an example.

In an example, as shown in FIG. 2, the step S103 may further include:

S201, determining the fusion attribute of each subnet, where the fusion attribute of each subnet is the same as the fusion attribute of each network layer of the subnet;

S202, determining a target processor corresponding to each subnet according to the fusion attribute of each subnet; and S203, based on the order of execution of each subnet, compiling and running, by the target processor corresponding to each subnet, the fusion operator of each subnet in overall to obtain the output result of the target neural network according to model data and weight data of each subnet.

Alternatively, the fusion attribute of the subnet includes a first fusion attribute and a second fusion attribute. The target processor of each subnet may include a first processor and a second processor, where the first processor may be an artificial intelligence processor, and the second processor may be a general processor such as CPU, GPU, DSP, or FPGA. Of course, the first processor and the second processor may both be general processors. Similarly, the fusion attribute of each subnet may indicate whether the subnet may run in the first processor. For instance, when the first processor supports a fusion operation of the subnet, the fusion attribute of the subnet may be the first fusion attribute. When the first processor does not support the fusion operation of the subnet, the fusion attribute of the subnet may be the second fusion attribute.

Furthermore, if the fusion attribute of the subnet is the first fusion attribute, it may be determined that the target processor corresponding to the subnet is the first processor. If the fusion attribute of the subnet is the second fusion attribute, it may be determined that the target processor corresponding to the subnet is the second processor. Furthermore, when the electronic device runs the target neural network according to the order of execution of each subnet, if the fusion attribute of a current subnet is the first fusion attribute, the first processor compiles the fusion operator of the current subnet in overall and runs the fusion operator to obtain an output result of the current subnet. The output result of the current subnet may include the output data of each network layer of the subnet. If the fusion attribute of the current subnet is the second fusion attribute, the second processor compiles the fusion operator of the current subnet in overall and runs the fusion operator to obtain the output result of the current subnet. The output result of the current subnet may include the output data of each network layer of the subnet. In the example of the present disclosure, each subnet is compiled in overall and ran, which may not only reduce the copying process of input data or output data between different network layers, but also reduce the data copy between different processors, and may thus improve the operation rate.

Alternatively, the first processor may be an artificial intelligence processor, and the second processor may be a general-purpose processor. If the fusion attribute of the subnet is the first fusion attribute, it is determined that a target processor corresponding to the subnet is the artificial intelligence processor; and if the fusion attribute of the subnet is the second fusion attribute, it is determined that the target processor corresponding to the subnet is the general-purpose processor such as CPU, GPU, or DSP. It may be understood that the electronic device may call the general-purpose processor to process a subnet with the second fusion attribute to realize overall compiling of subnets with the second fusion attribute. Similarly, the electronic device may call the artificial intelligence processor to process a subnet with the first fusion attribute to realize overall compiling of subnets with the first fusion attribute.

Alternatively, in an example, the electronic device may determine the order of execution of each subnet in the target neural network by traversing an original network corresponding to the target neural network. Specifically, the step S102 may further include:

if at least one network layer of a current subnet has a dependency on at least one network layer of another subnet, determining that the current subnet has a dependency on the another subnet, so as to determine dependencies between the subnets; and determining the order of execution of each subnet according to the dependencies between the subnets.

Specifically, the method may include: for each subnet, starting from a random network layer to traverse all the network layers of the subnet, determining whether a neighbor network layer of a network layer is in the subnet, if the neighbor network layer is not in the subnet, determining that the network layer and the neighbor network layer belong to different subnets, and the two different subnets have a dependency on each other, and if the network layer and the neighbor network layer are both in the subnet, determining that the network layer and the neighbor network layer belong to the same subnet.

Further, the order of execution of each subnet may be determined according to the dependencies between the subnets. If the neighbor network layer is not in the subnet, and the neighbor network layer is a previous neighbor network layer of the network layer, the method includes determining that the subnet is executed after a subnet to which the previous neighbor network layer belongs is executed. If the neighbor network layer is not in the subnet, and the neighbor network layer is a next neighbor network layer of the network layer, the method includes determining that the subnet is executed before a subnet to which the next neighbor network layer belongs is executed. The neighbor network layer of the network layer is a network layer which has an input/output relation with the network layer. The previous neighbor network layer is an input network layer of the network layer. The next neighbor network layer is an output network layer of the network layer.

Figure 3:
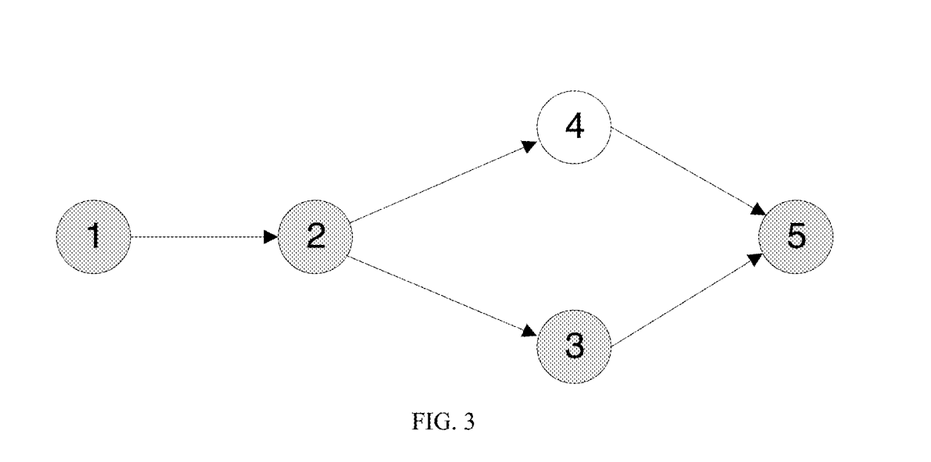
FIG. 3 is a diagram of a target neural network according to an example.

For instance, as shown in FIG. 3, the original network corresponding to the target neural network includes 5 network layers, in which network layers 1-3 belong to a first subnet, a network layer 4 belongs to a second subnet, and a network layer 5 belongs to a third subnet. Since the network layer 2 in the first subnet and the network layer 4 in the second in the second subnet have a dependency, it may be determined that the first subnet and the second subnet have a dependency. The network layer 3 in the first subnet and the network layer 5 in the third subnet have a dependency, it may be determined that the first subnet and the third subnet have a dependency. The network layer 4 in the second subnet and the network layer 5 in the third subnet have a dependency, it may be determined that the second subnet and the third subnet have a dependency. Moreover, since input of the third subnet depends on output of the second subnet and output of the third subnet, input of the second subnet depends on output of the network layer 2 in the first subnet, therefore, according to the dependencies between the subnets, it may be determined that the order of execution of each subnet is: the first subnet, the second subnet, and the third subnet.

Alternatively, the order of execution of each subnet and network layer information of each subnet are stored in a target object created in Caffe. Alternatively, in another example, the electronic device may determine the order of execution of each subnet in the target neural network directly by obtaining the prestored order of execution of the subnets in the target object of Caffe.

When the data processing method of the present example is adopted, a target neural network is subject to subnet classification. The target neural network includes at least one subnet, where each subnet includes at least one network layer, the network layer of the subnet has a same fusion attribute, and at least one operator of the network layer is fused into a fusion operator. When performing the computation on the subnet, the electronic device is capable of compiling all operators of all network layers of the subnet in overall to obtain a computational instruction of the subnet. Then the electronic device may obtain output data of the subnet according to input data, weight data, and the computational instruction of the subnet. In other words, at least for the subnet, compared with pluralities of input operations and output operations required to perform operations on network layers in the subnet layer by layer, only one input operation and one output operation are required, thus the operation rate may be improved.

Figure 4:
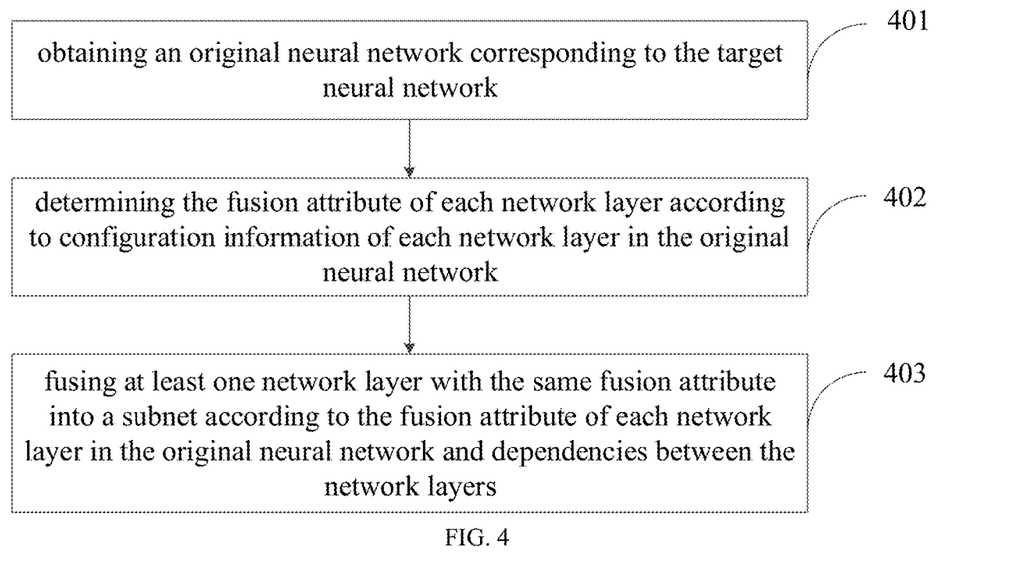
FIG. 4 is a flowchart of a data processing method according to an example.

Alternatively, in an example, as shown in FIG. 4, based on the data processing method of FIG. 1b, the present example relates to a process of classifying an original into subnets to obtain a target neural network, which may include:

S401, obtaining an original neural network corresponding to the target neural network.

Model data of the original neural network may include, but not limited to, input data of the original neural network, configuration information in each network layer, dependencies between the network layers (directed connections or output/input relations), and the like. The configuration information in each network layer may at least include an operator type of the network layer.

The method includes: S402, determining the fusion attribute of each network layer according to configuration information of each network layer in the original neural network.

Specifically, the configuration information in each network layer may be preconfigured information such as a fusion function in each network layer. The electronic device may determine the fusion attribute of each network layer according to the fusion function in each network layer.

Specifically, the fusion attribute of each network layer includes a first fusion attribute and a second fusion attribute. The electronic device may include a first processor and a second processor. For instance, the electronic device may predetermine whether each network layer can be supported by the first processor to perform a fusion operation. For each network layer, the electronic device may look up the logic of each operator of the network layer, logic for the fusion operator, and the interface for calling the logic in a preset function library associated with the first processor. If there are logic for all the operators of the network layer, the logic for the fusion operator, and the interface for calling the logic in the preset function library, the electronic device determines that the first processor supports the network layer performing the fusion operation, and determines that the function attribute of the network layer is the first fusion attribute. If there are no logic for any operator of the network layer, no logic for the fusion operator, and no interface for calling any logic in the preset function library, the electronic device determines that the first processor does not support the network layer performing the fusion operation, and determines that the function attribute of the network layer is the second fusion attribute. By way of illustration, the preset function library stores logic codes of various operators. An instruction obtained by compiling the logic codes of the various operators may be recognized and performed by the first processor.

Furthermore, the first processor may be an artificial intelligence processor, and the second processor may be a general-purpose processor. The electronic device may determine whether the operator in the network layer may be supported by the artificial intelligence processor, so as to determine the fusion attribute of the network layer. In addition, in an example, the configuration information of the network layer may further include the fusion attribute of the network layer, and the electronic device may parse the configuration information to obtain the fusion attribute of the network layer.

Alternatively, the fusion attribute of the network layer includes a first fusion attribute and a second fusion attribute. The step S402 may include:

obtaining a return value of a preset fusion attribute function of each network layer;

if the return value of the network layer is a first return value, determining that the fusion attribute of the network layer is the first fusion attribute; and if the return value of the network layer is a second return value, determining that the fusion attribute of the network layer is the second fusion attribute.

By way of illustration, it may be added to each network layer that a function mfus_supported( ) returns true or false to indicate whether a fusion operation is supported. mfus_supported( ) is a predefined fusion attribute function which may determine whether logic for each operator of the network layers and an interface for calling the logic exist in the preset function library. If the logic for each operator of the network layers and the interface for calling the logic exist in the preset function library, the function returns true, which refers to the first function attribute. If the logic for each operator of the network layers and the interface for calling the logic does not exist in the preset function library, the function returns false, which refers to the second function attribute. By way of illustration, if a network layer includes some uncommon operators or some complex detection operators, and the preset function library does not have corresponding logic and interface, then mfus_supported( ) in the network layer returns false, which means the network layer has the second fusion attribute. By way of illustration, if the preset function library is a function library associated with the artificial intelligence processor, the artificial intelligence processor may support the overall compiling of the subnets with the first fusion attribute, but does not support the overall compiling of the subnets with the second fusion attribute. If the preset function library is a function library associated with the general-purpose processor, the general-purpose processor may support the overall compiling of the subnets with the first fusion attribute, but does not support the overall compiling of the subnets with the second fusion attribute.

The method includes: S403, fusing at least one network layer with the same fusion attribute into a subnet according to the fusion attribute of each network layer in the original neural network and dependencies between the network layers.

Specifically, when the fusion attributes of all the network layers of the original neural network are the same, the network layers of the original neural network may be fused into one subnet. When the fusion attributes of all the network layers of the original neural network are not entirely the same, the network layers of the original neural network may be fused into a plurality of subnets.

Alternatively, at least one network layer with the same attribute may be fused into a subnet through the fusion function set in each network layer. Further, the method above may also include:

adding an operator corresponding to each network layer of the subnet to a same fusion operator according to the preset fusion function in each network layer. Specifically, the electronic device may create a fusion operator of the subnet according to a predefined fusion type, and add the operator of each network layer of the subnet to the fusion operator via a fuser( ) function of each layer. By way of illustration, the electronic device may traverse each network layer of the subnet, and add the operator of each network layer to the fusion operator according to a topological sort of each network layer.

Specifically, the method may further include a process of storing a classification result of the subnet, which may include: creating a corresponding relation between a network identifier of each subnet and an identifier of at least one network layer of the subnet, and storing the corresponding relation. Specifically, the electronic device displays the corresponding relation in a form of a table or network structure diagram.

Figure 5:
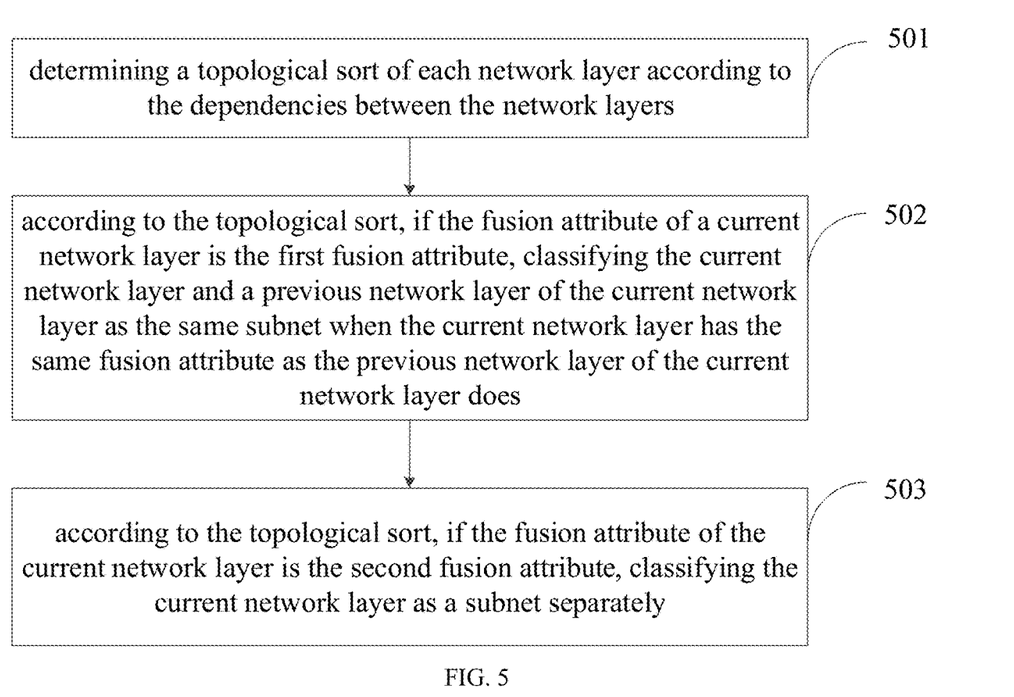
FIG. 5 is a flowchart of a data processing method according to an example.

In an example, as shown in FIG. 5, the step S403 may further include:

S501, determining a topological sort of each network layer according to the dependencies between the network layers;

S502, according to the topological sort, if the fusion attribute of a current network layer is the first fusion attribute, classifying the current network layer and a previous network layer of the current network layer as the same subnet when the current network layer has the same fusion attribute as the previous network layer of the current network layer does; and S503, according to the topological sort, if the fusion attribute of the current network layer is the second fusion attribute, classifying the current network layer as a separate subnet.

It needs to be explained that a previous network layer of the network layer is normally an input network layer of the network layer, and a next network layer is normally an output network layer of the network layer. For each network layer in the topological sort, a previous network layer of the network layer is a previous network layer of the network layer in the topological sort, and a next network layer is a next network layer of the network layer in the topological sort.

It can be understood that the network layers of the subnets in the target neural network should be in accordance with the topological sort, which means that the network layers in the target neural network are sorted into a linear sequence according to directed connections between the network layers. For any group of a network layer U and a network layer V that have a directed connection (pointing to the network layer V from the network layer U), the network layer U precedes the network layer V in the linear sequence. When the subnet is a section of the linear sequence, the subnet is in accordance with the topological sort. In this way, a normal input/output relation can be ensured between the subnet and another subnet or between the network layers in the target neural network.

Specifically, the method includes forming the network layers in the target neural network into a sequence according to the directed connections (input/output relations) between the network layers of the target neural network. For any group of two network layers (an input layer and an output layer) with a directed connection, the input layer precedes the output layer in the sequence. Indexes of the network layers may be obtained by numbering the network layers according to the positions of the network layers in the sequence, in which the indexes may be numbered from small to large. Starting from a first network layer of the sequence, the first network layer may be used as an original subnet for determining whether a next network layer of the first network layer has a same fusion attribute as the first network layer does. If the next network layer has the same fusion attribute as the first network layer does, the next network layer is added to the original subnet. If the next network layer does not has the same fusion attribute as the first network layer does, a finial original subnet is used as a subnet of the original network layer, the next network layer is used as a new first subnet, then the subnet classification is performed again until the network layers of the original network layer are all traversed to obtain a plurality of classified subnets.

Referring to FIG. 3, based on a way of classification shown in the FIG. 3, a directed graph can be obtained according to the directed connections (in Caffe, data is transferred between the network layers via a blob class, which can be regarded as a directed edge that connects network layers) between the network layers of the target neural network. The network layers in the figure are marked with fusion attributes. For instance, the network layers 1, 2, 3, 5 are marked with the first fusion attribute, and the network layer is marked with the second fusion attribute. In this way, the subnet classification may be changed into a process of finding a largest connection subgraph with a same attribute in such graph. A classification result based on the largest connection subgraph may be two subnets which are [1, 2, 3, 5] and [4]. However, the subnets obtained from such classification may have a confusing input/output relation. For instance, the network layer 5 may be computed before the network layer 4. However, the directed connection between the network layer 4 and the network layer 5 is pointing to network layer 5 from the network layer 4. In other words, the input data of the network layer 5 includes the output data of the network layer 4, which may not be in accordance with the topological sort.

In the present disclosure, the topological sort of the network layers may first be determined according to the dependencies between the network layers. For instance, the topological sort of the network layers may be: network layer 1-network layer 2-network layer 3-network layer 4-network layer 5. Then subnet classification may be performed according to the topological sort. For the original neural network shown in FIG. 4, starting from the network layer 1 whose index is 1 (which is a first network layer in accordance with the topological sort), the electronic device may use the network layer 1 as an original subnet to determine whether the network layer 2 whose index is 2 (which is a second network layer in accordance with the topological sort) has the same fusion attribute as the network layer 1 does. Since the network layers 1 and 2 have the same fusion attribute, the network layer 2 is added to the original subnet to which the network layer 1 belongs. Next, electronic device may determine whether the network layer 3 whose index is 3 has the same fusion attribute as the network layer 2 does. Since the network layers 2 and 3 have the same fusion attribute, the network layer 4 is added to the original subnet to which the network layer 3 belongs. Then the electronic device may determine whether the network layer 4 whose index is 4 has the same fusion attribute as the network layer 3 does. Since the network layers 3 and 4 have different fusion attributes, and the fusion attribute of the network layer 4 is the second fusion attribute, a final original subnet [1, 2, 3] is regarded as a subnet, and the network layer 4 is regarded as another original subnet. Furthermore, the electronic device may determine whether the network layer 5 whose index is 5 has the same fusion attribute as the network layer 4 does. Since the network layers 4 and 5 have different fusion attributes, a final original subnet [4] is regarded as a subnet, and the remaining network layer 5 is regarded as a subnet. The following three subnets are obtained from the classification, which are: [1, 2, 3], [4], and [5].

Based on this, the original neural network is classified into the three subnets in the table below:

| subnet | layer index included |
|---|---|
| subnet [0] | 1, 2, 3 |
| subnet [1] | 4 |
| subnet [2] | 5 |

An instance of another subnet classification that is in accordance with the topological sort is as follows: for the original neural network shown in FIG. 3, the process may start from network layer 2 whose index is 2. If the fusion attribute of network layer 2 is the first fusion attribute, and the network layer 2 has the same fusion attribute as the previous network layer of the network layer 2 (the network layer 1) does, then the network layer 2 and network layer 1 are classified into the same subnet. If the fusion attribute of network layer 3 is the first fusion attribute, and the network layer 3 has the same fusion attribute as the previous network layer (the network layer 2) does, the network layer 3 and the network layer 2 are classified into the same subnet. If the fusion attribute of the network layer 4 is the second fusion attribute, the network layer 4 is classified into a separate subnet. If the fusion attribute of the network layer 5 is the first fusion attribute and is different from the fusion attribute of the previous network layer (the network layer 4), the network layer 5 is classified into a separate subnet.

In an example, the step S403 may further include:
determining a topological sort of each network layer according to the dependencies between the network layers;
according to the topological sort, if the current network layer has the same fusion attribute as a previous network layer of the current network layer does, the current network layer and the previous network layer of the current network layer belong to the same subnet; and
according to the topological sort, if the current network layer has a different fusion attribute than the previous network layer of the current network layer does, the current network layer and the previous network layer of the current network layer belong to different subnets.

By way of illustration, the topological sort of the network layers may first be determined according to the dependencies between the network layers. For instance, the topological sort of the network layers may be: network layer 1-network layer 2-network layer 3-network layer 4-network layer 3-network layer 5. The fusion attributes of the network layers 1, 2, and 5 are the first fusion attribute. The fusion attributes of the network layers 3 and 4 are the second fusion attribute. In this case, the network layers 1 and 2 may be classified into a subnet, the network layers 3 and 4 may be classified into a subnet, and the network layers 5 may be classified into a subnet.

The data processing method of the present example may determine the fusion attributes of the network layers according to the configuration information of the network layers in the original neural network, and classify the original neural network into subnets according to the fusion attributes of the network layers and the dependencies between the neural networks, so as to obtain the target neural network after the subnet classification.

It should be noted that the neural network operation may include, but not limited to one or more of computation types such as a reshape operation, a forward operation and a back operation. Generally, in a process of performing the forward operation, the reshape operation may also be performed. For instance, for a current network layer, an output result or intermediate result of a previous network layer of the current network layer may be initialized by the reshape operation to adapt to an input requirement of the current network layer, then the forward operation may be performed. For instance, (32, 3, 28, 28) represents 32 pieces of 3-channel 28×28 pixel color pictures, which is the output result of the previous network layer of the current network layer. (32, 3, 14, 56) represents 32 pieces of 3-channel 14×56 pixel color pictures, which is the input requirement of the current network layer. Then the reshape operation may be performed to convert the (32, 3, 28, 28) color pictures into (32, 3, 14, 56) color pictures, which is equivalent to performing upscaling processing on the width and downscaling processing on the height for pictures of each color channel in each of the color picture in the input data. Specifically, in Caffe, reshape refers to initializing a shape stored in each output or intermediate blob in Caffe.

Specifically, the data processing method of the present disclosure is explained in detail from the perspective of Caffe, which is as follows:

in Caffe, the configuration information of the target neural network may be shown as the configuration file prototxt in the target neural network. The fusion attribute may also be predefined in the data structure file caffe.proto in Caffe. Caffe may create and initialize a net object according to the configuration file of the target neural network, create and initialize a subnet object for storing subnet objects obtained from classification, create a spliter (split) class object, call the split method of the spliter class object. The class is used for the subnet classification of the target neural network to obtain at least one subnet object. The at least one subnet object is stored in the subnets collection. When creating the spliter class, a graph can be created according to the directed connections between the network layers. The input/output relations between the subnets in the graph may be obtained by parsing the subnets collection, and are added to the subnets object. A forward computation is performed on the net object (the target neural network) by using the forward function in net. The forward function is associated with the operator and computation mode parameter in each subnet. The computation mode includes a fusion mode and a normal mode. The fusion mode corresponds to the data processing method of the present example. If the computation mode parameter in forward is the fusion mode, for a subnet object (which is a subnet with the first fusion attribute) supported by the artificial intelligence processor, a fusion operator object for the subnet object is created via a predefined fusion class, then all the network layers in the subnet object are traversed, all the operators used in the network layer are added to the fusion operator via the predefined fuser( ) function in each network layer in the subnet object, then the fusion operator is compiled to obtain a computational instruction of the subnet object corresponding to the fusion operator. At the same time, according to the input/output relations between the subnets in the subnets object, the input data of the subnets object is obtained. The input data and the computational instruction of the subnet object are sent to the artificial intelligence processor for processing. The computation result returned by the artificial intelligence processor is used as the output data of the subnets object.

It can be understood that the above-mentioned Caffe may be any applicable version, such as Cambricon Caffe, which is an optimized version.

It should be understood that though the steps in the flowcharts FIGS. 1b-2, 4-5 are shown following the direction of arrows, yet these steps may not necessarily be performed in the order indicated by the arrows. Unless clearly stated herein, the order for performing these steps is not strictly confined. These steps may be performed in a different order. Furthermore, at least part of the steps in FIGS. 1b-2, 4-5 may include a plurality of substeps or a plurality of phases. These substeps or phases may not necessarily be performed and completed at the same time, or be performed sequentially, instead, these sub-steps or phases may be performed in turn or alternately with other steps, or the substeps of other steps, or at least part of the phases.

Figure 6:
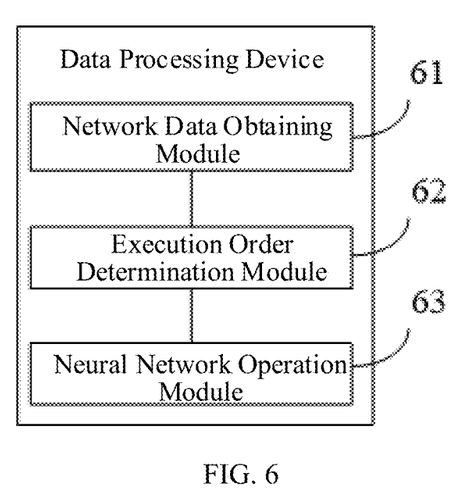
FIG. 6 is a structural diagram of a data processing device according to an example.

An example shown in FIG. 6 provides a data processing device including: a network data obtaining module 61, an execution order determination module 62, and a neural network operation module 63.

The network data obtaining model 61 is configured to obtain model data and weight data of a target neural network, where the target neural network includes at least one subnet, each subnet includes at least one network layer, the network layer of the subnet has a same fusion attribute, and at least one operator of the network layer is fused into a fusion operator.

The execution order determination module 62 is configured to determine an order of execution of each subnet in the target neural network.

The neural network operation module 63 is configured to compile and run the fusion operator corresponding to each subnet in overall according to the model data, the weight data, and the order of execution of each subnet of the target neural network to obtain an output result of the target neural network.

Figure 7:
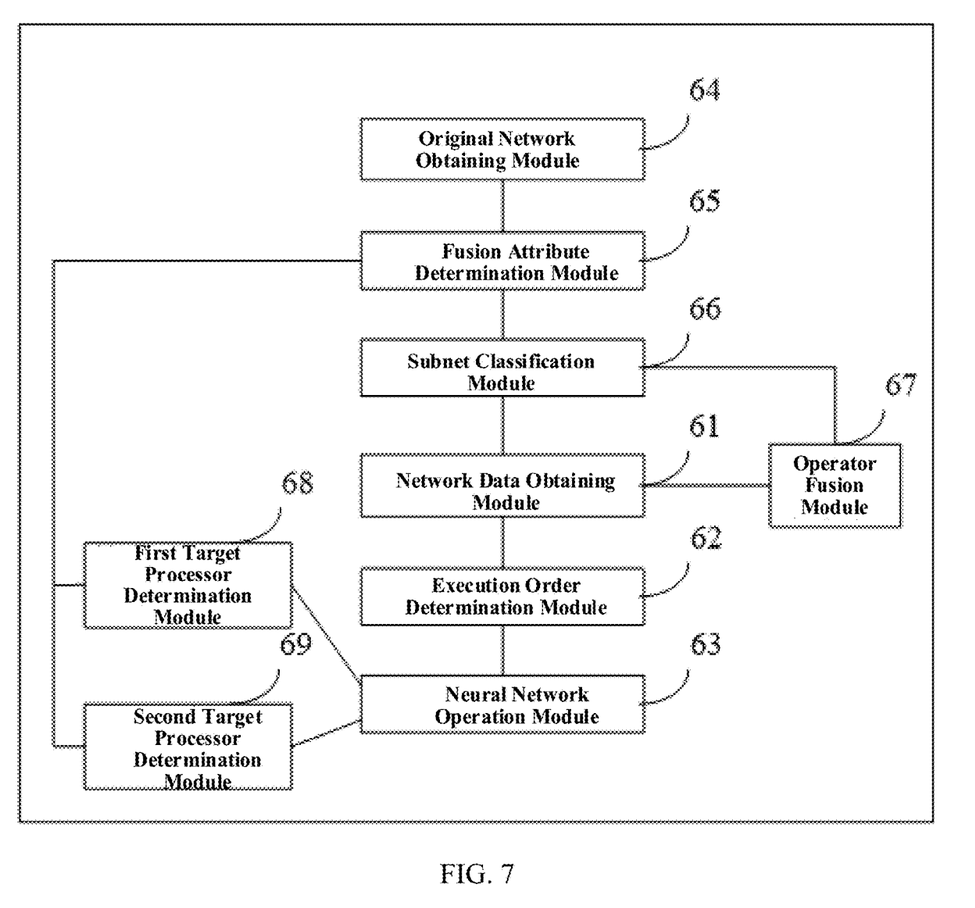
FIG. 7 is a structural diagram of a data processing device according to an example.

Alternatively, referring to FIG. 7, based on FIG. 6, the device may further include:
an original network obtaining module 64 configured to obtain an original neural network corresponding to the target neural network;
a fusion attribute determination module 65 configured to determine the fusion attribute of each network layer according to configuration information of each network layer in the original neural network; and
a subnet classification module 66 configured to fuse at least one network layer with the same fusion attribute into a subnet according to the fusion attribute of each network layer in the original neural network and dependencies between the network layers.

Alternatively, the fusion attribute of the network layer includes a first fusion attribute and a second fusion attribute. The fusion attribute determination module 65 may include:
a function value return unit configured to obtain a return value of a preset fusion attribute function of each network layer;
a first fusion attribute determination unit configured to, if the return value of the network layer is a first return value, determine that the fusion attribute of the network layer is the first fusion attribute; and
a second fusion attribute determination unit configured to, if the return value of the network layer is a second return value, determine that the fusion attribute of the network layer is the second fusion attribute.

Alternatively, the subnet classification module 66 is configured to determine a topological sort according to the dependencies between the network layers. According to the topological sort, if the fusion attribute of a current network layer is the first fusion attribute, the subnet classification module 66 is configured to classify the current network layer and a previous network layer of the current network layer as the same subnet when the current network layer has the same fusion attribute as the previous network layer of the current network layer does. According to the topological sort, if the fusion attribute of the current network layer is the second fusion attribute, the subnet classification module 66 is configured to classify the current network layer as a separate subnet.

Alternatively, the subnet classification module 66 is configured to determine a topological sort according to the dependencies between the network layers. According to the topological sort, if a current network layer has a same fusion attribute as a previous network layer of the current layer does, the current network layer and the previous network layer belong to a same subnet. According to the topological sort, if the current network layer has a different fusion attribute than the previous network layer of the current layer does, the current network layer and the previous network layer belong to different subnets.

Alternatively, referring to FIG. 7, the device may further include:
- an operator fusion module 67 configured to add an operator corresponding to each network layer of the subnet to a same fusion operator according to the preset fusion function in each network layer.

Alternatively, the neural network operation module 63 may include:
- a compiling unit configured to compile each fusion operator to obtain a computational instruction corresponding to each fusion operator; and
- an operation unit configured to run each subnet according to the computational instruction of each fusion operator and weight data and input data of each subnet to obtain the output result of the target neural network.

Alternatively, the execution order determination module 62 may include:
- a dependency determination unit configured to, if at least one network layer of a current subnet has a dependency on at least one network layer of another subnet, determine that the current subnet has a dependency on the another subnet, so as to determine dependencies between the subnets; and
- an execution order determination unit configured to determine the order of execution of each subnet according to the dependencies between the subnets.

Alternatively, the order of execution of each subnet and network layer information of each subnet are stored in a target object created in Caffe.

Alternatively, the neural network operation module 63 may include:
- a third fusion attribute determination unit configured to determine the fusion attribute of each subnet, where the fusion attribute of each subnet is the same as the fusion attribute of each network layer of the subnet;
- a target processor determination unit configured to determine a target processor corresponding to each subnet according to the fusion attribute of each subnet; and
- a target processor operation unit configured to, based on the order of execution of each subnet and the target processor corresponding to each subnet, compile and run the fusion operator of each subnet in overall to obtain the output result of the target neural network according to model data and weight data of each subnet.

Alternatively, the fusion attribute of the subnet includes a first fusion attribute and a second fusion attribute. The device may include:
- a first target processor determination module 68 configured to, if the fusion attribute of the subnet is the first fusion attribute, determine that a target processor corresponding to the subnet is an artificial intelligence processor; and
- a second target processor determination module 69 configured to, if the fusion attribute of the subnet is the second fusion attribute, determine that the target processor corresponding to the subnet is a general-purpose processor.

When the data processing device of the present example is adopted, a target neural network is subject to subnet classification. The target neural network includes at least one subnet, where each subnet includes at least one network layer, the network layer of the subnet has a same fusion attribute, and at least one operator of the network layer is fused into a fusion operator. When performing the computation on the subnet, the electronic device is capable of compiling all operators of all network layers of the subnet in overall to obtain a computational instruction of the subnet. Then the electronic device may obtain output data of the subnet according to input data, weight data, and the computational instruction of the subnet. In other words, at least for the subnet, compared with pluralities of input operations and output operations required to perform operations on network layers in the subnet layer by layer, only one input operation and one output operation are required, thus the operation rate may be improved.

A specific description of the data processing device is similar to the description of the data processing method in the preceding part, and is thus omitted here. Each of the modules in the data processing device above may be wholly or partially implemented through software, hardware, and a combination thereof. Each of the units may be embedded or independently arranged in a processor of an electronic device in a form hardware, and may also be stored in a memory of the electronic device in a form of software, so that the processor may call and perform a corresponding operation of each of the units.

An example provides an electronic device including a memory and a processor. A computer program is stored in the memory. When the processor executes the computer program, the processor implements the following steps:
- obtaining model data and weight data of a target neural network, where the target neural network includes at least one subnet, each subnet includes at least one network layer, the network layer of the subnet has a same fusion attribute, and at least one operator of the network layer is fused into a fusion operator;
- determining an order of execution of each subnet in the target neural network; and
- compiling and running the fusion operator corresponding to each subnet in overall according to the model data, the weight data, and the order of execution of each subnet of the target neural network to obtain an output result of the target neural network.

The electronic device may include, but not limited to, a data processing device, a robot, a computer, a printer, a scanner, a tablet, a smart terminal, a mobile phone, a traffic recorder, a navigator, a sensor, a webcam, a server, a cloud-based server, a camera, a video camera, a projector, a watch, a headphone, a mobile storage, a wearable device, a vehicle, a household appliance, and/or a medical equipment. The vehicle may include an airplane, a ship, and/or a car.

The household electrical appliance may include a television, an air conditioner, a microwave oven, a refrigerator, an electric rice cooker, a humidifier, a washing machine, an electric lamp, a gas cooker, and a range hood. The medical equipment may include a nuclear magnetic resonance spectrometer, a B-ultrasonic scanner, and/or an electrocardiograph.

An example provides a readable storage medium. A computer program is stored in the readable storage medium. When a processor executes the computer program, the processor implements the following steps:

obtaining model data and weight data of a target neural network, where the target neural network includes at least one subnet, each subnet includes at least one network layer, the network layer of the subnet has a same fusion attribute, and at least one operator of the network layer is fused into a fusion operator;

determining an order of execution of each subnet in the target neural network; and compiling and running the fusion operator corresponding to each subnet in overall according to the model data, the weight data, and the order of execution of each subnet of the target neural network to obtain an output result of the target neural network.

One of ordinary skill in the art may understand that the entire or part of the flow in the methods as stated in the examples may be carried out by instructing related hardware by a computer program which may be stored in a nonvolatile computer readable storage medium. When the program is executed, it may include the flow of each of the method as stated in the examples. Any reference to the memory, storage, database, or any other medium used in the examples provided in the present disclosure may include a nonvolatile and/or volatile memory. The nonvolatile memory may include ROM (Read Only Memory), PROM (Programmable ROM), EPROM (Electrically PROM), EEPROM (Electrically Erasable PROM), or flash memory. The volatile memory may include a RAM (Random Access Memory) or an external cache memory. By way of illustration and rather than limitation, the RAM may be obtained in various forms, such as a SRAM (Static RAM), a DRAM (Dynamic RAM), a SDRAM (Synchronous DRAM), a DDRSDRAM (Double Data Rate SDRAM), an ESDRAM (Enhanced SDRAM), a SLDRAM (Synchlink DRAM), a RDRAM (Rambus Direct RAM), a DRDRAM (Direct Rambus Dynamic RAM), and a RDRAM (Rambus Dynamic RAM).

The technical features in the above-mentioned examples may be combined randomly. For a brief description, not every possible combination of the technical features in the above-mentioned examples is described. However, combinations of these technical features shall be considered within the range of the description as long as they do not contradict to each other.

The above-mentioned examples are merely some examples of the present disclosure. The disclosure is described in a detailed way. Nonetheless, it should not be considered limiting of the scope of protection claimed by the present disclosure. It should be indicated that one of ordinary skill in the art may make some variations and improvements within the idea of the disclosure, and these variations and improvements are within the scope of protection claimed by the present disclosure. Therefore, the scope of protection claimed by the present disclosure shall be subject to the attached claims.

What is claimed:

1. A data processing method comprising:
obtaining model data and weight data of a target neural network,
wherein the target neural network includes multiple network layers,
wherein each of the multiple network layers is associated with a fusion attribute,
wherein the fusion attribute indicates whether operations of a corresponding network layer can be performed by a given type of processor,
wherein each of the multiple network layers includes a preset fusion attribute function,
wherein the preset fusion attribute function, when executed, causes a fusion attribute determination circuit to search a function library of the given type of processor to determine whether logic of each operator of the network layer, logic for the fusion operator, and an interface for calling the logic are included in the function library, and
wherein a true return value of the preset fusion attribute function indicates that the operations of the network layer can be performed by the given type of processor when the logic of each operator of the network layer, the logic for the fusion operator, and the interface for calling the logic are included in the function library;
classifying the multiple network layers into multiple subnets based on the fusion attributes of each of the multiple network layers and dependencies between the multiple network layers, wherein network layers within a same subnet have a same fusion attribute,
fusing operators of the network layers in the same subnet into a fusion operator;
determining an order of execution of the multiple subnets in the target neural network based on a dependency relationship between the multiple subnets; and
compiling and running the fusion operator corresponding to each of the multiple subnets according to the model data, the weight data, and the order of execution of the multiple subnets of the target neural network to obtain an output result of the target neural network.

2. The method of claim 1, further comprising:
obtaining an original neural network corresponding to the target neural network,
determining the fusion attribute of each of the multiple network layers according to configuration information of each of the multiple network layers in the original neural network.

3. The method of claim 2, wherein the fusion attribute of each of the multiple network layers includes a first fusion attribute and a second fusion attribute, and the determining the fusion attribute of each network layer according to the configuration information of each network layer in the original neural network includes:
obtaining a return value of the preset fusion attribute function of each network layer,
if the return value of the network layer is a first return value, determining that the fusion attribute of the network layer is the first fusion attribute, and
if the return value of the network layer is a second return value, determining that the fusion attribute of the network layer is the second fusion attribute.

4. The method of claim 3, wherein the classifying the multiple network layers into multiple subnets based on the fusion attributes of each of the multiple network layers and dependencies between the multiple network layers includes:

determining a topological sort of each network layer according to the dependencies between the multiple network layers, according to the topological sort, if the fusion attribute of a current network layer is the first fusion attribute, classifying the current network layer and a previous network layer of the current network layer as a same subnet when the current network layer has the same fusion attribute as the previous network layer of the current network layer does, and according to the topological sort, if the fusion attribute of the current network layer is the second fusion attribute, classifying the current network layer as a separate subnet.

5. The method of claim 3, wherein the dependencies between the multiple network layers includes:

determining a topological sort of each network layer according to the dependency between each network layer, according to the topological sort, if a current network layer has the same fusion attribute as a previous network layer of the current network layer does, the current network layer and the previous network layer of the current network layer belong to a same subnet, and according to the topological sort, if the current network layer has a different fusion attribute than the previous network layer of the current network layer does, the current network layer and the previous network layer of the current network layer belong to different subnets.

6. The method of claim 1, further comprising:

adding the operators corresponding to the network layers of the same subnet to a same fusion operator according to a preset fusion function in each of the one or more network layer.

7. The method of claim 6, wherein the compiling and running the fusion operator corresponding to each of the multiple subnets to obtain the output result of the target neural network includes:

compiling each fusion operator of each of the multiple subnets to obtain a computational instruction corresponding to each fusion operator, and running each of the multiple subnets according to the computational instruction of each fusion operator and weight data and input data of each subnet to obtain the output result of the target neural network.

8. The method of claim 1, wherein the determining the order of execution of the multiple subnets in the target neural network includes:

if at least one network layer of a current subnet has a dependency on at least one network layer of another subnet, determining that the current subnet has a dependency on the another subnet, so as to determine dependencies between the respective subnets, and determining the order of execution of each subnet according to the dependencies between the respective subnets.

9. The method of claim 1, wherein the order of execution of each subnet and network layer information of each subnet are stored in a target object which is created in a deep learning frame work.

10. The method of claim 1, wherein the compiling and running each subnet according to the model data, the weight data, and the order of execution of each subnet of the target neural network to obtain the output result of the target neural network includes:

determining the fusion attribute of each subnet, wherein the fusion attribute of each subnet is the same as the fusion attribute of each network layer of the subnet, determining a target processor corresponding to each subnet according to the fusion attribute of each subnet, and based on the order of execution of each subnet, compiling and running, by the target processor corresponding to each subnet, the fusion operator of each subnet to obtain the output result of the target neural network according to model data and weight data of each subnet.

11. The method of claim 10, wherein the fusion attribute of the subnet includes the first fusion attribute and the second fusion attribute, and the method further includes:

if the fusion attribute of the subnet is the first fusion attribute, determining that a target processor corresponding to the subnet is a first type of processor, and if the fusion attribute of the subnet is the second fusion attribute, determining that the target processor corresponding to the subnet is a second type of processor.

12. A data processing device comprising:

a network data obtaining circuit configured to:

obtain model data and weight data of a target neural network, wherein the target neural network includes multiple network layers, wherein each of the multiple network layers is associated with a fusion attribute, wherein the fusion attribute indicates whether operations of a corresponding network layer can be performed by a given type of processor, wherein each of the multiple network layers includes a preset fusion attribute function, wherein the preset fusion attribute function, when executed, causes a fusion attribute determination circuit to search a function library of the given type of processor to determine whether logic of each operator of the network layer, logic for the fusion operator, and an interface for calling the logic are included in the function library, and wherein a true return value of the preset fusion attribute function indicates that the operations of the network layer can be performed by the given type of processor when the logic of each operator of the network layer, the logic for the fusion operator, and the interface for calling the logic are included in the function library;

classify the multiple network layers into multiple subnets based on the fusion attributes of each of the multiple network layers and dependencies between the multiple network layers, wherein network layers within a same subnet have a same fusion attribute;

fuse operators of the network layers in the same subnet into a fusion operator;

an execution order determination circuit configured to determine an order of execution of the multiple subnets in the target neural network; and a neural network operation circuit configured to compile and run the fusion operator corresponding to each of the multiple subnets according to model data, weight data, and the order of execution of the multiple subnets of the target neural network to obtain an output result of the target neural network.

* * * * *